United States Patent [19]

Watanabe

[11] Patent Number: 5,045,997

[45] Date of Patent: Sep. 3, 1991

[54] DATA PROCESSOR

[75] Inventor: Akira Watanabe, Kamakura, Japan

[73] Assignee: Mitsubishi Denki K.K., Tokyo, Japan

[21] Appl. No.: 264,056

[22] Filed: Oct. 28, 1988

[30] Foreign Application Priority Data

Dec. 3, 1987 [JP] Japan .................. 62-306212

[51] Int. Cl.$^5$ .............................. G06F 13/14
[52] U.S. Cl. ................... 364/200; 364/239;
364/242.6; 364/242.91
[58] Field of Search ... 364/200 MS File, 900 MS File

[56] References Cited

U.S. PATENT DOCUMENTS

| | | | |
|---|---|---|---|
| 4,245,299 | 1/1981 | Woods et al. | 364/200 |
| 4,453,214 | 6/1984 | Adcock | 364/200 |
| 4,536,839 | 8/1985 | Shah et al. | 364/200 |
| 4,639,862 | 1/1987 | Wada et al. | 364/200 |
| 4,654,788 | 3/1987 | Boudreau et al. | 364/200 |
| 4,780,812 | 10/1988 | Freestone et al. | 364/200 |

FOREIGN PATENT DOCUMENTS 0185370 6/1987 European Pat. Off. .

OTHER PUBLICATIONS

Intel Advance Information, "iMCC Map Communications Controller Component Set", Oct. 1987.

Primary Examiner—Michael R. Fleming
Assistant Examiner—Debra A. Chun
Attorney, Agent, or Firm—Kanesaka & Takeuchi

[57] ABSTRACT

The efficiency of a processor in which a packet is stored in a receiver buffer, processed in a central processing unit, and sent out via a transmitter buffer, is low. According to the invention, data is transferred to a high-speed memory via the receiver memory. When the high-speed memory is filled with data, the data is processed by the CPU, and the packet is transmitted from the high-speed memory via the transmitter memory. A competition control section is provided to control data accesses in the sequential operation.

2 Claims, 8 Drawing Sheets

RECEIVING OPERATION

FIG.5(b)

TRANSMITTING OPERATION

DATA PROCESSOR

BACKGROUND OF THE INVENTION

The present invention relates generally to data processors to be connected to a data bus and, more particularly, to a memory competition circuit for avoiding competition among requests for access to the memory of a data processor.

Figure 7:
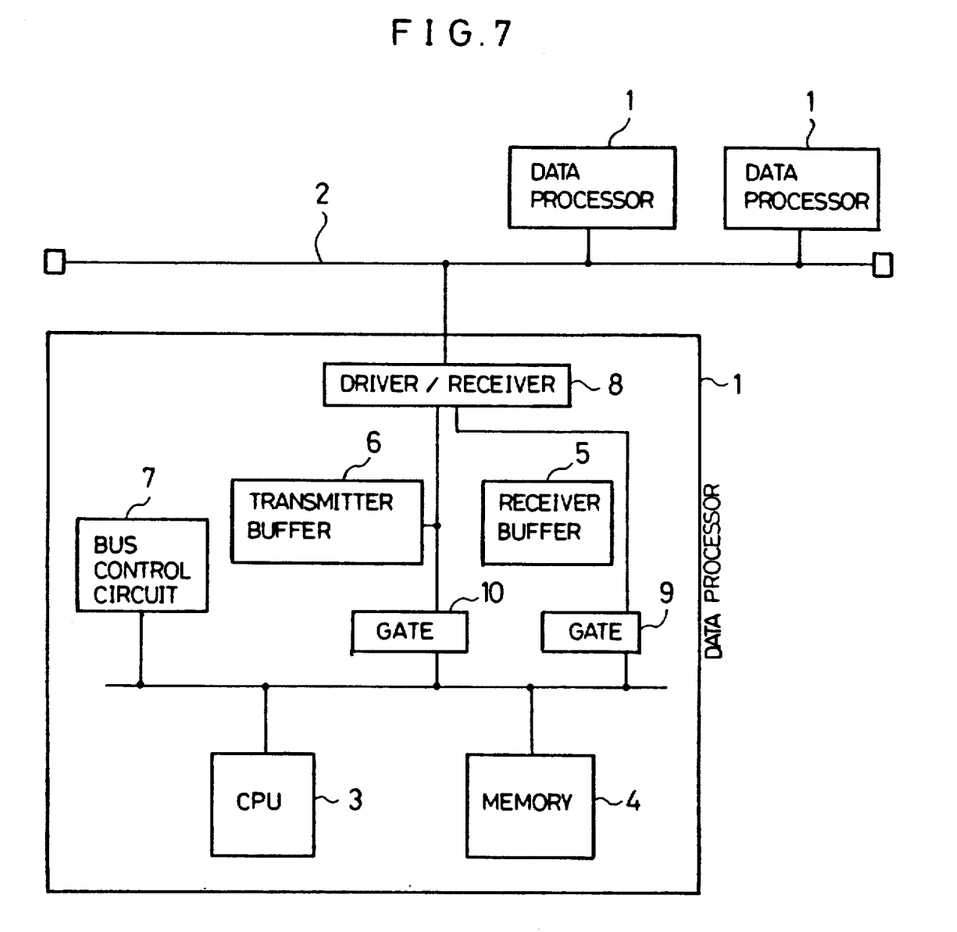
FIG. 7 is a block diagram of a conventional data processor.

FIG. 7 shows a plurality of conventional data processors 1 connected to a bus 2. Each data processor 1 includes a central processing unit (CPU) 3 for performing arithmetic operation and control to process data, a memory 4 for storing information necessary to process data, a receiver buffer 5 for temporarily storing a received packet, a transmitter buffer 6 for temporarily storing a packet to be transmitted, a bus control circuit 7 for controlling the transmission and reception of a packet from the bus 2, a driver/receiver 8 for receiving or transmitting a packet to the bus 2, a gate circuit 9 for controlling communications between the receiver buffer 5 and the CPU 3, and a gate circuit 10 for controlling communications between the transmitter buffer 6 and the CPU 3.

In operation, for purposes of simplicity, it is assumed that all data is transmitted in units of byte. The data processor 1 takes in a packet addressed to it from the bus 2. After processing, it transmits a response packet to a predetermined data processor. Since packets are transmitted at random from other data processors, the data processor 1 needs to finish the above processing cycle—reception, data processing, and transmission to the bus—as soon as possible. The CPU 3 of the data processor 1 executes the above process according to a program stored in the memory 4.

The receiver buffer 5 and transmitter buffer 6 are made of high-speed memories capable of transmitting data at high speeds and temporarily store a packet received from or transmitted to the bus 2. The bus control circuit 7 controls the transmission and reception of a packet from the bus 2. When the data processor 1 does not engage in transmission or reception of data from the bus 2, it is put in a state always able to receive data from the bus 2. At this point, the gate circuit 9 is closed, and the receiver buffer 5 receives a packet from the bus 2 independently of the operation of the CPU 3. The gate circuit 10 may be closed or opened.

Figure 8:
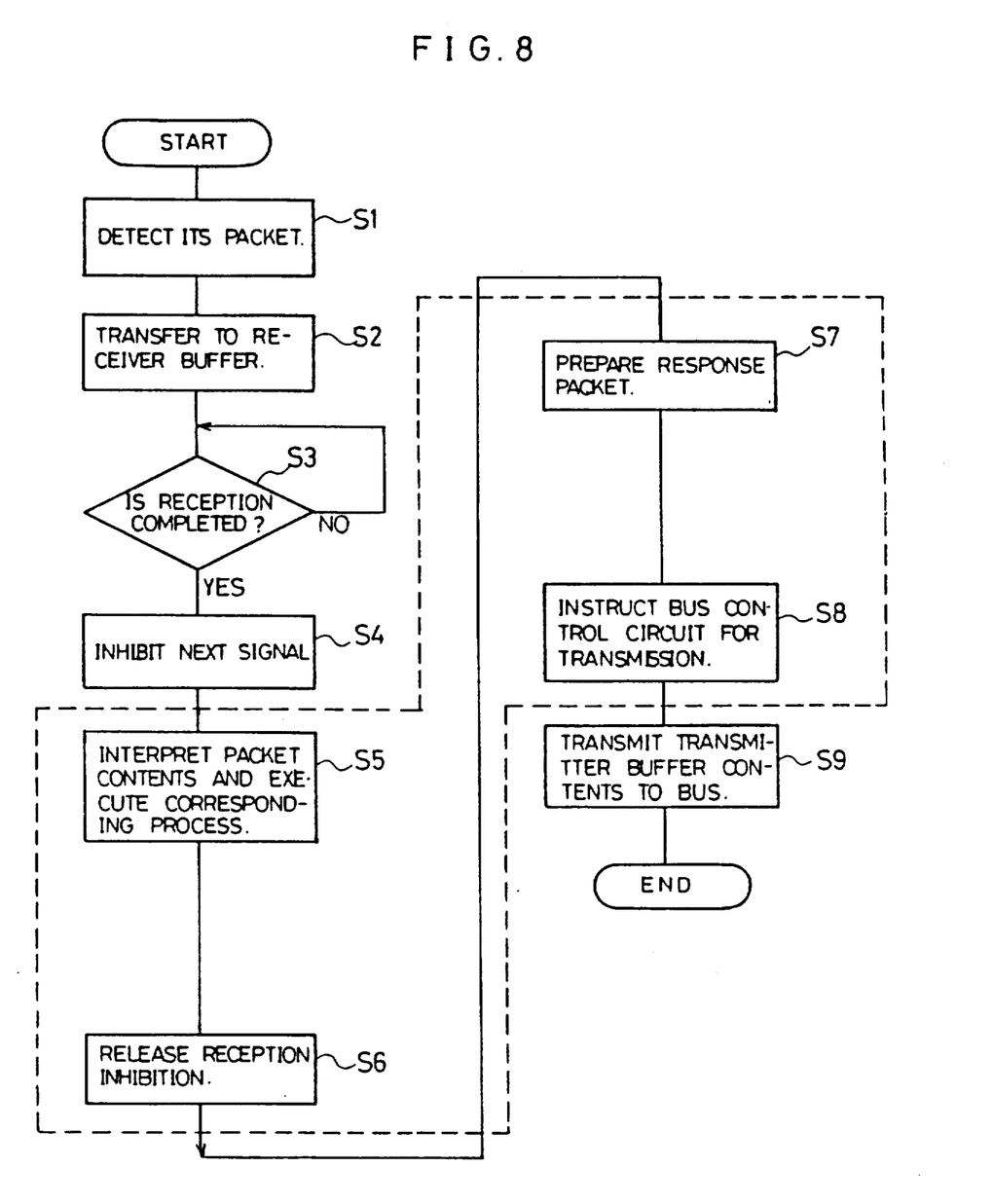
FIG. 8 is a flowchart showing the operation of the conventional data processor.

In FIG. 8, when the bus control circuit 7 finds a packet addressed to it on the bus 2 (Step S1), it transfers the packet to the receiver buffer 5 via the driver/receiver 8 (Step S2). Upon completion of the packet reception (Step S3), the bus control circuit 7 is put in a busy state to inhibit reception of the next packet (Step S4). The CPU 3 opens the gate circuit 9, interprets the contents of the received packet, and performs a process specified by the contents (Step S5). Upon completion of the process, the CPU 3 closes the gate circuit 9 and releases the bus control circuit 7 from the busy state so as to enable the next reception from the bus 2 (Step S6).

The CPU 3 then opens the gate circuit 10 and prepares a response packet for the transmission buffer 6 (Step S7). Upon completion of preparation of the response packet, the CPU 3 closes the gate circuit 10 and instructs the bus control circuit 7 for transmission (Step S8). The bus control circuit 7 occupies the bus 2 with an access method inherent to the system and transmits the contents of the transmitter buffer 6 to the bus 2 via the driver/receiver 8 (Step S9).

The steps S5-S8 involve a job portion processed by the CPU 3 according to the program, and the steps S1-S4 and step S9 are for job portions processed by the other hardware. The steps S1-S4 and S5-S8 are carried out in parallel, and the steps S5-S8 and S9 are carried out in parallel.

In the conventional data processor as described above, the next packet is unable to be received until the process of a received packet is completed. Consequently, the transmitting data processor needs a device for repeating the transmission of a packet until the receiving data processor takes it. When the receiving unit takes much time to process, the contents of a received packet must be moved to a work area of the memory 4 to empty the receiver buffer. It is also necessary to provide separate transmitter and receiver buffers. Particularly, the frequency of busy states in the receiver buffer becomes so high that it lowers the efficiency of the processor.

SUMMARY OF THE INVENTION

Accordingly, it is an object of the invention to provide a data processor capable of processing data transmitted to or received from a data bus with high efficiency.

According to the invention, data is taken into a high-speed memory from a data bus via a receiver buffer, processed in a central processing unit, stored in the high-speed memory, and transmitted to the data bus from the high-speed memory via a transmitter buffer. A competition control section controls reading and writing of data in the sequential operation. Consequently, it is possible to accept data requests from the data bus within the memory capacity of the high-speed memory, thus increasing the process speed.

These objects together with others not specifically mentioned will become clear to those skilled in the art from the following description taken in conjunction with the accompanying drawings.

DESCRIPTION OF THE PREFERRED EMBODIMENT

Figure 1:
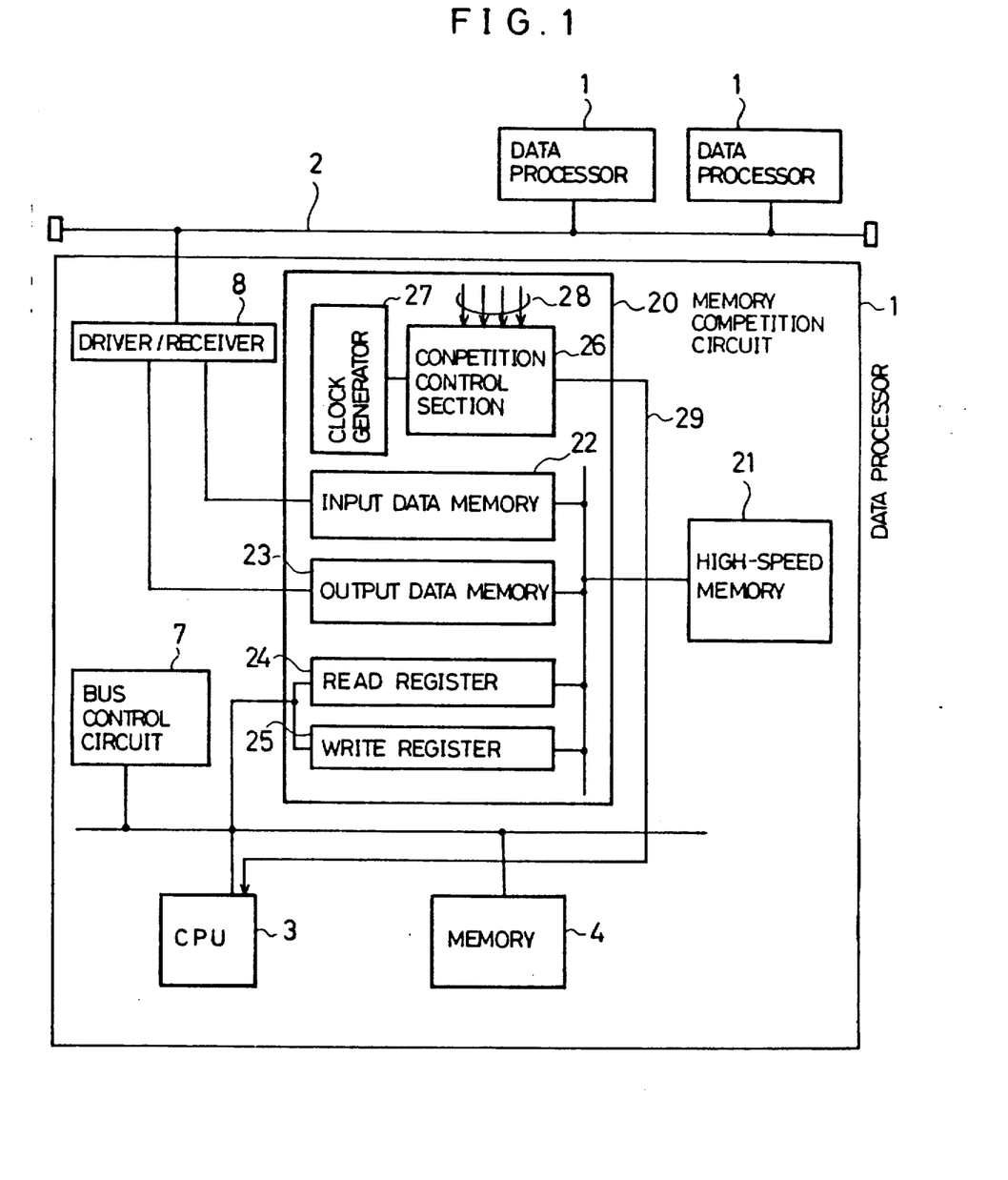
FIG. 1 is a block diagram of a data processor according to an embodiment of the invention.

FIG. 1 shows a plurality of data processors 1 connected to a bus 2. Each data processor 1 includes a CPU 3 to perform arithmetic operation and control for processing data, a memory 4 to store information necessary for processing data, a bus control circuit 7 for controlling the transmission and reception of a packet from the bus 2, a driver/receiver 8 for receiving or transmitting a packet to the bus 2, a memory competition circuit 20, and a high-speed memory 21.

The memory competition circuit 20 includes a input data memory 22 for temporarily storing data input to the high-speed memory 21 from the bus 2, an output data memory 23 for temporarily storing data to be output to the bus 2 from the high-speed memory 21, a read register 24 for temporarily latching data read out of the high-speed memory 21 by the CPU 3, a write register 25 for temporarily latching data to be written in the high-speed memory 21 by the CPU 3, and a competition control section 26.

In response to a request for access to the high-speed memory 21, the competition control section 26 operates with a clock supplied by a clock generator 27 which is independent of a clock with which the bus 2 and the CPU 3 operate. The competition control section 26 receives requests 28 for access to the high-speed memory 21, or a write/read request from the CPU 3, a request for reception from the bus 2, and a request for transmission to the bus 2 and executes writing in the high-speed memory 21 from the write register 25, reading into the read register 24, writing from the input data memory 22, and reading out to the output data memory 23.

When there are a plurality of access requests 28 at the same time, the competition control section 26 executes the accesses according to the predetermined priority order to thereby avoid competition for access to the high-speed memory 21. The access requests 28 forced to wait are processed as follows. Since the input and output data memories 22 and 23 serve as buffer memories for transmission to and reception from the bus 2, there is no data loss even if there is a little delay in access to the high-speed memory 21. When the access request 28 from the CPU 3 is delayed, the competition control section 26 issues a wait signal to the CPU 3 so that the CPU 3 postpones its process.

Figure 2:
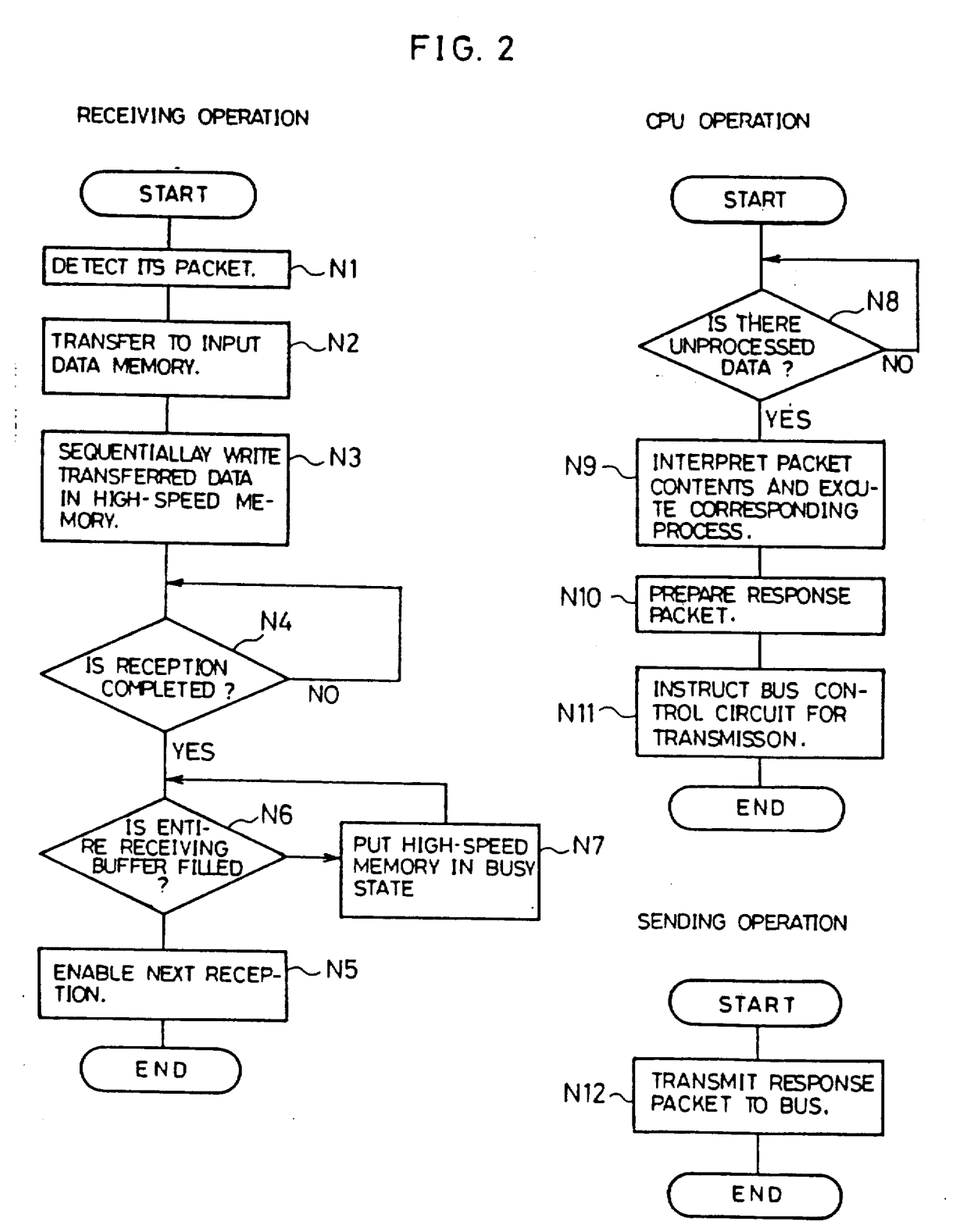
FIG. 2 is a flowchart showing the operation of the processor of FIG. 1.

In FIG. 2, the operation of the data processor 1 as a whole is the same as that of the conventional one. When the bus control circuit 7 finds a packet addressed to it on the bus 2 (Step N1), it transfers the packet to the input data memory 22 via the driver/receiver 8 (Step N2). The competition control section 26 sequentially writes the transferred data (packet) in the high-speed memory 21 (Step N3). Upon completion of the reception (Step N4), the bus control circuit 7 switches to a new area of the high-speed memory 21 as a receiver buffer to thereby enable the next reception (Step N5). The area of the receiver buffers as a whole is predetermined and is divided into a plurality of buffers which are used in a circulatory manner.

When all the receiver buffers are filled with data (Step N6), the area of the receiver buffers is put in a busy state (Step N7). This state rarely occurs in this system.

The CPU 3 checks if there is any unprocessed data which has been transferred to the high-speed memory 21 via the memory competition circuit 20 (Step N8). If any, the CPU 3 interprets the contents of the packet and executes the process according to the contents (Step N9). Upon completion of this process, the CPU 3 prepares a response packet for another area of the high-speed memory 21 (Step N10). Upon completion of this response packet preparation, the CPU 3 instructs the bus control circuit 7 for transmission (Step N11). The bus control circuit 7 occupies the bus 2 by an access method inherent to the system and transmits the response packet to the bus 2 via the driver/receiver 8 (Step N12). In this way, the receiving operation (Steps N1-N9), CPU operation (Steps N8-N11), and sending operation (Step N12) are carried out independently.

In the above embodiment, it is possible to provide both receiver and transmitter buffers in the same memory area (of high-speed memory 21) so that transmission to or reception from the bus 2 and execution of a program may be processed simultaneously, thus increasing the efficiency. Since the high-speed memory 21 is accessed through the input data memory 22, output data memory 23, read register 24, or write register 25, and since the competition control section 26 reads from or writes in the high-speed memory 21, both transmission to or reception from the bus 2 and access to the high-speed memory 21 from the CPU 3 may be made simultaneously.

Figure 3:
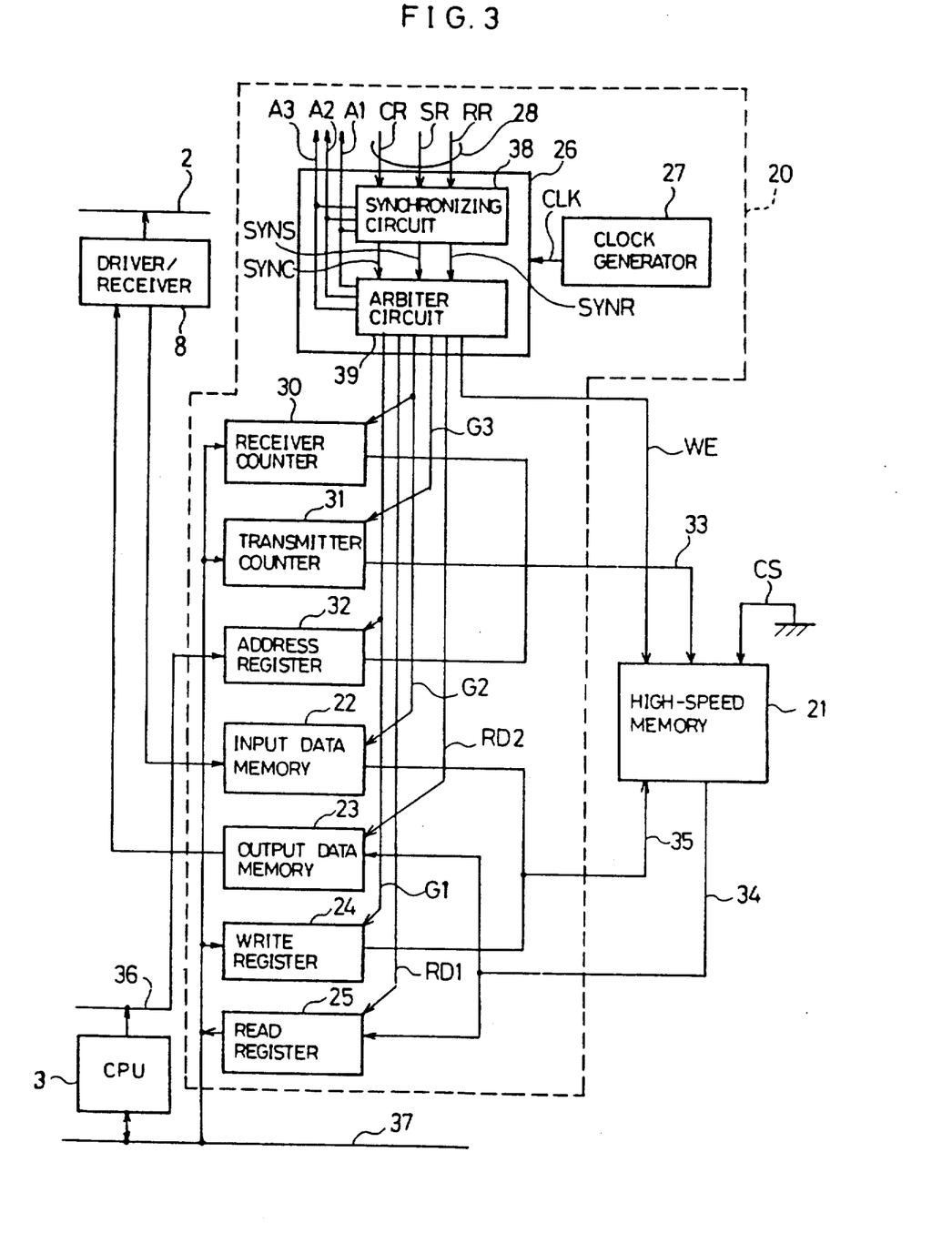
FIG. 3 is a detailed block diagram of the memory competition circuit in FIG. 1.

FIG. 3 shows the memory competition circuit 20 in more detail. Members equivalent to those of FIG. 1 are assigned the same reference numerals and their description will be omitted. The wait signal 29 in FIG. 1 will be omitted for purposes of simplicity. The memory competition circuit 20 includes a receiver counter 30, a transmitter counter 31, an address register 32, an address bus 33 for the high-speed memory 21, a data output bus 34 for the high-speed memory 21, a data input bus 35 for the high-speed memory 21, an address bus 36 for the CPU 3, a data bus 37 for the CPU 3, a synchronizing circuit 38, and an arbiter circuit 39.

In FIGS. 3-6, CLK represents a clock signal supplied by a clock generator 27, CR a write/read request signal from the CPU 3, SYNC a synchronized CPU request signal, A1 a CPU request response signal, G1 a gate open signal for the address register 32 and write register 24, WE a write signal into the high-speed memory 21, RD a write signal into the read register 25, RR a receiving request signal, SR a sending request signal, A2 a receiving request response signal, A3 a sending request response signal, SYNR a synchronized receiving request signal, SYNS a synchronized sending request signal, G2 a count-up signal of the receiver counter 30 which also serves as a gate open signal for the receiver counter 30 and input data memory 22, G3 a gate open signal for the transmitter counter 31, RD2 a write signal into the output data memory 23, and CS a chip select signal to the high-speed memory 21.

The initial values of the receiver counter 30 and transmitter counter 31 indicate the leading addresses of the receiver and transmitter buffers, respectively, and have been set by the CPU 3 prior to transmission to or reception from the bus 2. Alternatively, they may be set by an automatic switch according to another logic. The address register 32 is designed to latch information on the address bus 36 for the CPU 3 at the time of a write/read request by the CPU 3. The synchronizing circuit 38 synchronizes access requests 28 with a clock signal CLK. The arbiter circuit 39 selects a request of the highest priority with a synchronized request signal and issues a signal, with appropriate timing to the receiver counter 30, transmitter counter 31, address register 32, input data memory 22, output data memory 23, write register 24, read register 25, or high-speed memory 21. The gate open signals G1, G2, and G3 are significant at a low level ("L"); i.e., the gate is opened. Data on the bus is written in a register or memory at the transition from "L" to "H" of a write signal. The chip select signal CS for the high-speed memory 21 is always in a selected state (GND).

Figure 4:
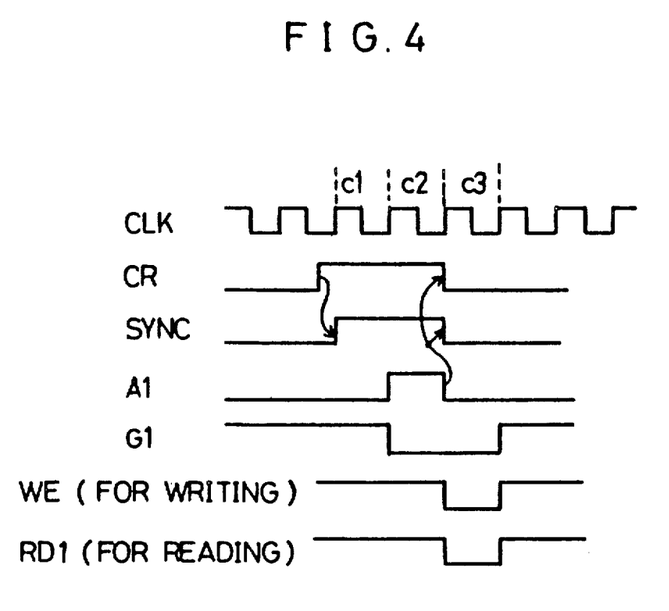
FIGS. 4-6 are timing charts showing the operations of the memory competition circuit of FIG. 3.

FIG. 4 shows the operation in response to an access request by the CPU 3. The CPU read/write request signal CR is synchronized on a clock pulse c1 to form a synchronized CPU request signal SYNC. The arbiter circuit 39 issues a CPU request response signal A1 indicating the acceptance of the request. In response to the CPU request response signal A1, the sychronizing circuit 38 resets the synchronized CPU request signal SYNC as well as the CPU read/write request signal CR. The arbiter circuit 39 opens the gate of the address register 32 with gate open signal G1 on clock pulses c2 and c3 to issue at a clock pulse c3 a write signal WE into the high-speed memory 21 or a read signal RD1 into the read register 25 depending on the request.

Figure 5A:
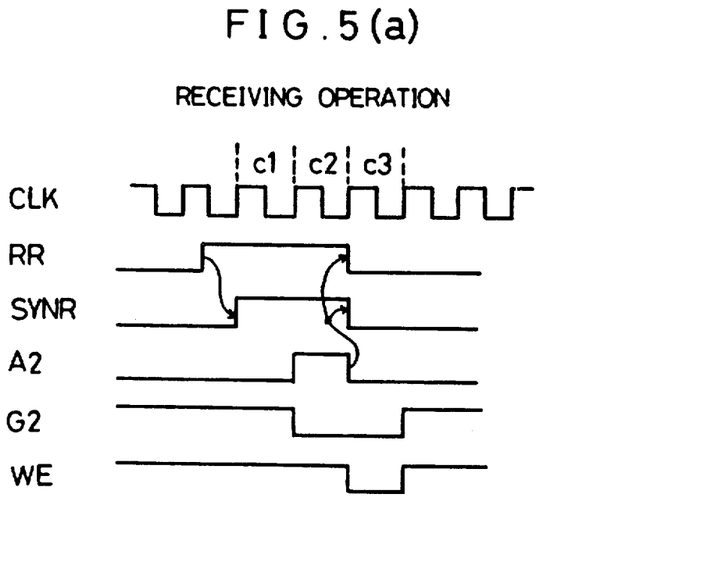
Figure 5B:
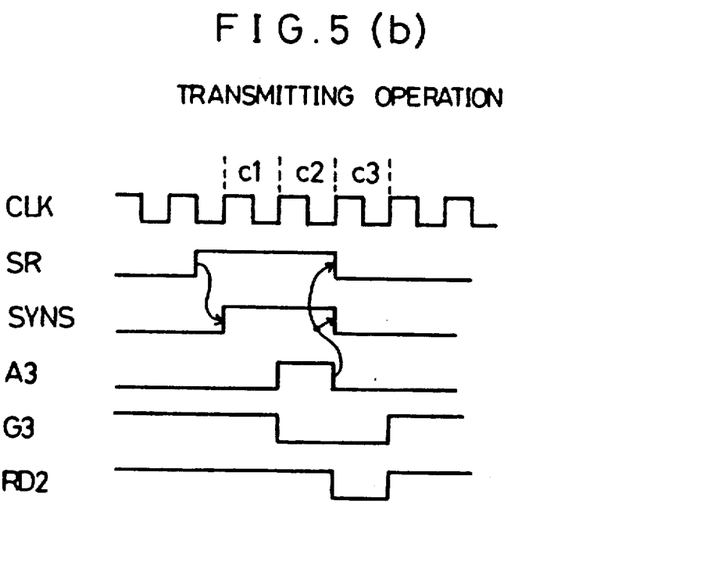

FIGS. 5(a) and 5(b) show the operations in response to sending and receiving requests from the bus 2, respectively. Since the timing is identical for both sending and receiving requests except signals issued, description will be made on a receiving request. The data received from the bus 2 is input to the input data memory 22. When the data is output from the input data memory 22, a receiving request signal RR is issued. The receiving request signal RR is synchronized on a clock pulse c1 to form a synchronized receiving request signal SYNR. The arbiter circuit 39 issues a receiving request response signal A2 indicating acceptance of the request. In response to the receiving request response signal A2, the synchronizing circuit 38 resets the synchronized receiving request signal SYNR as well as the receiving request signal RR. In response to a gate open signal G2, the arbiter circuit 39 opens the gate of the receiver counter 30 on clock pulses 2 and 3 and issues a write signal WE into the high-speed memory 21 on the clock pulse c3. The receiver counter 30 is counted up at the trailing edge of the gate open signal G2 to prepare for the next receiving request.

Figure 6:
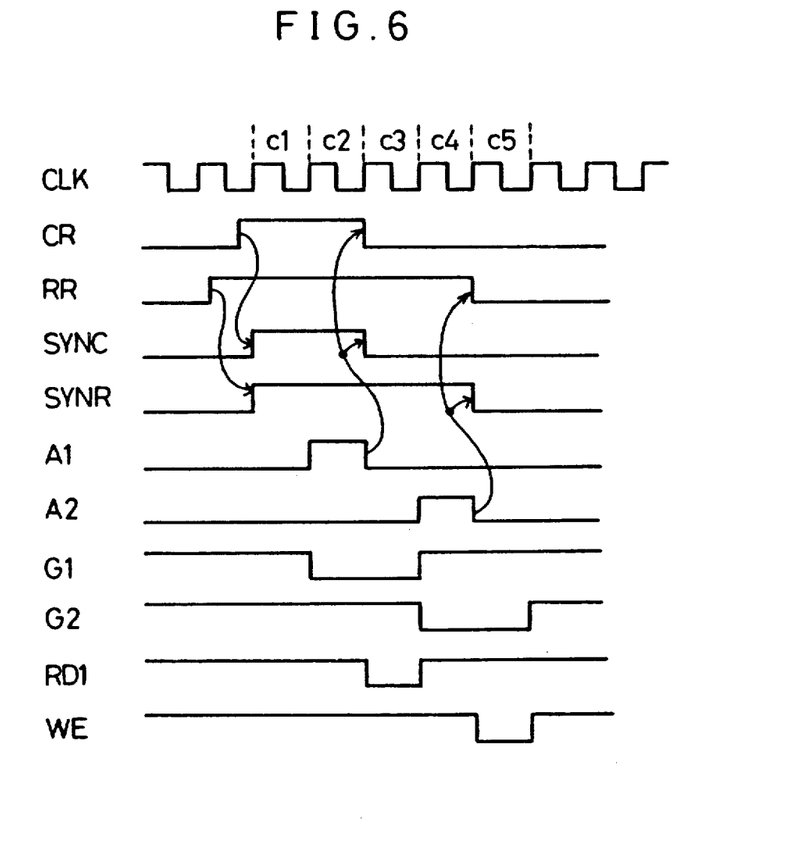

FIG. 6 shows the operation wherein a read request from the CPU has priority to a receiving request from the bus 2 when these requests compete each other. The CPU write/read request signal CR and receiving request signal RR are synchronized simultaneously on a clock pulse c1 to form a sychronized CPU request signal SYNC and a synchronized receiving request signal SYNR, respectively. Since the CPU request has priority, it is selected to issue a CPU request response signal A1 on a clock pulse c2. In response to the CPU request response signal A1, the CPU write/read request signal CR and synchronized CPU request signal SYNC are reset.

Similarly to FIG. 4, an address register gate open signal G1 is issued on the clock pulses c2 and c3, and a write signal RD1 into the read register 25 is issued on the clock pulse c3. The arbiter circuit 39 looks for the next request signal on the clock c3 in parallel to the above operation, when the synchronized receiving request signal SYNR is detected. In response to this signal SYNR, a receiving request response signal A2 is issued on a clock pulse c4, and the receiving request signal RR and synchronized receiving request signal SYNR are reset. Similarly to FIG. 5(a), a receiving counter gate open signal G2 is issued on the clock pulses c4 and c5, and a write signal WE into the high-speed memory 21 is issued on the clock pulse c5.

As has been described above, according to the invention there is provided a memory competition circuit which includes an input data memory for temporarily storing data to be input to the high-speed memory from the bus, an output data memory for temporarily storing data output from the high-speed memory to the bus, a read register for temporarily latching data read out of the high-speed memory by the CPU, a write register for temporarily latching data to be written in the high-speed memory by the CPU, and a competition control section for receiving a write request from the input data memory, a read request into the output data memory, and a read or write request from the CPU to execute access to the high-speed memory according to the priority order among the input data memory, output data memory, read register, and write register, or issuing a wait signal to the CPU when access is not in time, so that it is possible to perform both transmission to or reception from the bus and access to the high-speed memory by the CPU at the same time. This makes it possible to provide a plurality of receiver buffers and a plurality of transmitter buffers within the same memory area, which reduces the frequency of busy states in the receiver buffer and, thus, increases the efficiency of the processor.

While a preferred embodiment of the invention has been described using specific terms, such description is for illustrative purposes only, and it is to be understood that changes and variations may be made without departing from the spirit and scope of the invention recited in the following claims.

What is claimed is:

1. A data processor to be connected to another data processor via a bus for transmitting or receiving data to execute a predetermined process, which comprises:
    (a) a central processing unit;
    (b) a high-speed memory; and
    (c) a memory competition circuit, said memory competition circuit including:
        (i) an input data memory connected to said bus for temporarily storing data to be input to said high-speed memory from said bus;
        (ii) an output data memory connected to said high-speed memory for temporarily storing data to be output to said bus from said high-speed memory;
        (iii) a read register connected to said high-speed memory for temporarily latching data read out of said high-speed memory by said central processing unit;
        (iv) a write register connected to said central processing unit for temporarily latching data to be written in said high-speed memory by said central processing unit;
        (v) a competition control section connected to said input and output data memories and said central processing unit for receiving a write request from said input data memory, a read request from said output data memory, a read request from said central processing unit, and a write request from said central processing unit to execute access to said high-speed memory by said requests according to a predetermined priority order among said input data memory, output data memory, read register and write register, or issuing a wait signal to said central processing unit when access is not in time,
        (vi) a clock generator for generating a clock signal independent of that of said central processing unit;
        (vii) a synchronizing circuit connected to said clock generator for synchronizing access requests to be input to said memory competition circuit; and
        (viii) an arbiter connected to said synchronizing circuit for selecting a request of the highest priority to control competition among said access requests for access to said high-speed memory.

2. The data processor of claim 1, wherein said memory competition circuit comprises:
a receiver counter;
a transmitter counter; and
means responsive to a count signal from said receiver or transmitter counter to manage addresses within said high-speed memory and switches an area of said high-speed memory between receiver and transmitter buffers for controlling transmission and reception between said input or output data memory and said high-speed memory.

* * * * *